US012611896B2

(12) United States Patent
Cho

(10) Patent No.: US 12,611,896 B2
(45) Date of Patent: Apr. 28, 2026

(54) TIRE MONITORING SENSOR POWERED BY WIRELESS POWER, SYSTEM AND CONTROL METHOD THEREOF, AND VEHICLE HAVING THE SAME

(71) Applicant: HL Klemove Corp., Incheon (KR)

(72) Inventor: Hyeon Yeop Cho, Yongin (KR)

(73) Assignee: HL Klemove Corp, Incheon (KR)

( * ) Notice: Subject to any disclaimer, the term of this patent is extended or adjusted under 35 U.S.C. 154(b) by 378 days.

(21) Appl. No.: 18/359,038

(22) Filed: Jul. 26, 2023

(65) Prior Publication Data

US 2024/0416687 A1    Dec. 19, 2024

(51) Int. Cl.
| | |
|---|---|
| *G08B 21/00* | (2006.01) |
| *B60C 23/04* | (2006.01) |
| *H02J 50/10* | (2016.01) |
| *H02J 50/40* | (2016.01) |

(52) U.S. Cl.
CPC ...... *B60C 23/0413* (2013.01); *B60C 23/0483* (2013.01); *H02J 50/10* (2016.02); *H02J 50/40* (2016.02)

(58) Field of Classification Search
CPC ............ B60C 23/0413; B60C 23/0483; B60C 23/0427; B60C 23/0433; H02J 50/10; H02J 50/40; H02J 50/12; H02J 50/80; H02J 7/0047; B60Y 2400/306
USPC ......................................................... 340/438
See application file for complete search history.

(56) References Cited

U.S. PATENT DOCUMENTS

| | | | |
|---|---|---|---|
| 9,815,342 B2 | 11/2017 | Dudar | |
| 2013/0307347 A1* | 11/2013 | Davila | H02J 50/90 |
| | | | 307/104 |
| 2014/0152252 A1* | 6/2014 | Wood | H02J 50/90 |
| | | | 320/108 |
| 2019/0312452 A1* | 10/2019 | Chen | H02J 50/402 |
| 2024/0356371 A1* | 10/2024 | You | H02J 7/00 |

FOREIGN PATENT DOCUMENTS

| | | |
|---|---|---|
| JP | 2010-012837 A | 1/2010 |
| KR | 10-2011-0131387 A | 12/2011 |
| KR | 10-1253669 B1 | 4/2013 |

(Continued)

OTHER PUBLICATIONS

Office Action Issued From Korean Patent Office Dated Dec. 23, 2025 Issued for Korean Patent Application No. 10-2023-0075363.

*Primary Examiner* — Mark S Rushing
(74) *Attorney, Agent, or Firm* — Harvest IP Law, LLP

(57) ABSTRACT

The present disclosure relates to a tire monitoring sensor, a system and a method for controlling the same. The system according to an embodiment of the present disclosure is provided in a vehicle, and may include: a tire monitoring sensor (TMS) comprising a battery and mounted on a tire or wheel of the vehicle, and detecting a condition of the tire; and a main transceiver provided at a position spaced apart from the TMS in the vehicle. The main transceiver comprises a plurality of coils configured to generate first magnetic fields by application of an alternating current. The plurality of coils is disposed such that the first magnetic fields are applied to the TMS sequentially according to a rotation of the tire or the wheel. The alternating current is applied to the plurality of coils such that adjacent first magnetic fields have opposite phases.

17 Claims, 11 Drawing Sheets

(56) References Cited

FOREIGN PATENT DOCUMENTS

| KR | 10-2351949 | B1 | | 1/2022 | | |
|---|---|---|---|---|---|---|
| KR | 102508492 | B1 | * | 3/2023 | .............. | H02J 50/80 |
| KR | 10-2024-0018976 | A | | 2/2024 | | |

* cited by examiner

100

Figure 5:
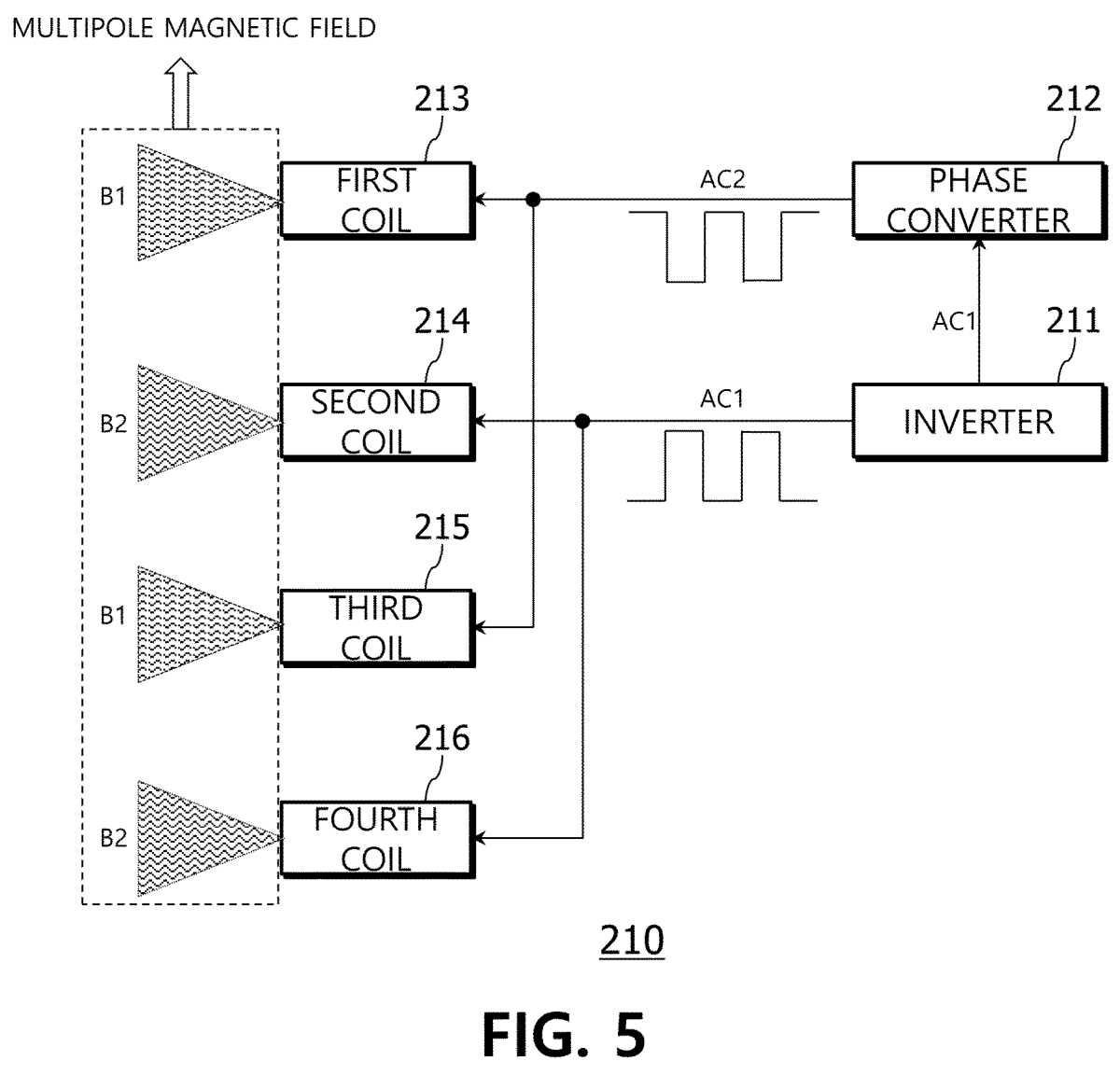

MULTIPOLE MAGNETIC FIELD

213

B1

FIRST
COIL

212

AC2

PHASE
CONVERTER

214

B2

SECOND
COIL

AC1

211

AC1

INVERTER

215

B1

THIRD
COIL

216

B2

FOURTH
COIL

TIRE MONITORING SENSOR POWERED BY WIRELESS POWER, SYSTEM AND CONTROL METHOD THEREOF, AND VEHICLE HAVING THE SAME

CROSS-REFERENCE TO RELATED APPLICATION

This application claims priority to and the benefit of Korean Patent Application No. 10-2023-0075363, filed on Jun. 13, 2023, the disclosures of which is incorporated herein by reference in its entirety.

FIELD

The present disclosure relates to a tire monitoring sensor technology, and more particularly, to a technology for generating a large induced electromotive force in a TMS enough to charge a battery of a tire monitoring sensor to a predetermined voltage or higher during wireless charging.

BACKGROUND

When the air pressure of the vehicle tire is not within the normal range, an accident may occur due to a tire burst or a vehicle slipping easily, the fuel efficiency of the vehicle decreases, and the vehicle's ride comfort and braking force decreases. In order to solve this problem, TMS and the like are applied so that it is possible to identify the air pressure condition of the tire. That is, the TMS is a sensor provided in a tire or wheel, and is a sensor that detects the air pressure condition of the tire of the vehicle.

Such a TMS generally includes a structure in which a battery is embedded in itself. This is because it is difficult to provide a separate power line to the TMS from the vehicle considering a structure in which the TMS is mounted. However, in order to replace the battery of the TMS, it is quite troublesome to unmount the TMS. Accordingly, a conventional technique for charging a battery of TMS using an electromagnetic induction wireless charging method is proposed.

That is, the conventional technique is a technique for charging a battery of TMS based on an induced electromotive force generated by the corresponding magnetic field in the TMS side receiving the magnetic field for wireless power transmission. However, the conventional technique is a conceptual technique that simply applies a general electromagnetic induction wireless power transmission technique to the TMS.

Accordingly, considering a mounting environment of the TMS mounted on a rotating tire or wheel and rotating along with the rotation of the tire or wheel, only a very low induced electromotive force is generated in the TMS side receiving the magnetic field by using the conventional technique. As a result, there may be a problem that the charging efficiency of the TMS battery decreases, the charging speed is very slow, and the voltage of the TMS battery is not charged to a predetermined value or more.

However, the above description merely provides background information about the present disclosure and does not correspond to the previously disclosed technology.

SUMMARY

In order to solve the above problems of the conventional technique, an object of the present disclosure is to provide a technology for wirelessly charging a battery of TMS by an electromagnetic induction method, and allowing a large induction electromotive force to be generated in the TMS as much as to charge a voltage of the battery by a predetermined value or more.

In addition, another purpose of the present disclosure is to provide a technology for efficiently charging a battery of TMS during wireless charging and increasing a charging speed of the battery.

In addition, another object of the present disclosure is to provide a technology for adjusting a polarity conversion frequency of a multipole magnetic field according to a condition of charging a battery of TMS or a rotation speed of a tire during wireless charging, and thus adjusting a charging efficiency and a charging speed of the battery.

However, the present disclosure is not limited to the above-mentioned tasks, and other tasks not mentioned may be clearly understood by those skilled in the art from the following description.

According to another aspect of the present disclosure, there is provided a system provided in a vehicle, the system including: a tire monitoring sensor (TMS) having a battery and mounted on a tire or wheel of the vehicle, and detecting a condition of the tire; and a main transceiver provided at a position spaced apart from the TMS in the vehicle and generating a first magnetic field for wireless power transmission.

In some embodiments, the TMS may perform a first function of transmitting first data, which is sensing data for the condition of the tire, and second data on a condition of the battery, to the main transceiver in a wireless communication method, a second function of wirelessly charging the battery according to an electromagnetic induction method by the first magnetic field, and a third function of generating a second magnetic field to be received by the main transceiver based on power induced by the first magnetic field for feedback on a current induced by the first magnetic field.

In some embodiments, the first magnetic field may be a multipole magnetic field comprising a magnetic field B1 having a characteristic of a first polarity and a magnetic field B2 having a characteristic of a second polarity different from the first polarity.

In some embodiments, the first magnetic field may be the multipole magnetic field in which the magnetic field B1 and magnetic field B2 are alternately arranged each other.

In some embodiments, a first case in which the TMS is exposed to the magnetic field B1 more than the magnetic field B2 and a second case in which the TMS is exposed to the magnetic field B2 more than the magnetic field B1 may occur alternately while the TMS rotates along with rotation of the tire.

In some embodiments, the main transceiver may include a plurality of B1 coils generating the magnetic field B1 according to a first alternating current AC1, and a plurality of B2 coils generating the magnetic field B2 according to a second alternating current AC2 phase-converted with respect to the AC1, wherein the B1 coils and the B2 coils are alternately arranged.

In some embodiments, the main transceiver may further include an inverter for converting a direct current DC to the AC1; and a phase convener for phase-converting the AC1 to the AC2.

In some embodiments, the AC1 may have a phase difference of 180° with the AC2.

In some embodiments, the main transceiver may be configured to identify a condition of a current used for wireless charging by the TMS according to the second function based on the received second magnetic field, and adjust a polarity conversion frequency of the first magnetic field according to the identified condition of the current.

In some embodiments, the main transceiver may increase the polarity conversion frequency when the identified current condition is lower than a reference value or when a charging voltage of the battery identified according to the second data is maintained for a predetermined time or lower than before.

In some embodiments, the main transceiver may adjust a polarity conversion frequency of the first magnetic field depending on a rotational speed of the tire identified according to the first data during wireless charging of the battery.

In some embodiments, the main transceiver may increase the polarity conversion frequency when the rotational speed of the tire decreases to a reference value or less during wireless charging of the battery.

The tire monitoring sensor (TMS) according to an embodiment of the present disclosure may be provided at a position spaced apart from a main transceiver generating a first magnetic field for wireless power transmission and mounted on a tire or wheel, and the TMS may include a battery providing power required for operation of the TMS; a communicator performing a first function of transmitting first data, which is sensing data for a condition of the tire, and second data on a condition of the battery, to the main transceiver in a wireless communication method; a wireless power transceiver receiving the first magnetic field and processing an induced electromotive force generated by an electromagnetic induction method according to the first magnetic field; and a charger performing a second function of charging the battery using a current transmitted from the wireless power transceiver.

In some embodiments, the wireless power transceiver may perform a third function of generating a second magnetic field to be received by the main transceiver based on the power induced by the first magnetic field for feedback on the current induced by the first magnetic field.

A method for controlling a system according to an embodiment of the present disclosure may include a tire monitoring sensor (TMS) having a battery and mounted on a tire or wheel of the vehicle, and detecting a tire condition, and a main transceiver provided at a position spaced apart from the TMS in the vehicle, and the method may include performing a first function of transmitting, by the TMS, first data, which is sensing data for a condition of the tire, and second data on a condition of the battery, in a wireless communication method to the main transceiver; generating a first magnetic field for wireless power transmission when the main transceiver determines that a specific situation occurs according to analysis of the received first and second data; performing, by the TMS, a second function of wirelessly charging the battery according to an electromagnetic induction method using the first magnetic field; and performing, by the TMS, a third function of generating a second magnetic field to be received by the main transceiver based on power induced by the first magnetic field for feedback on a current induced by the first magnetic field.

In some embodiments, the specific situation may be a situation in which the charging voltage of the battery is lowered below a reference while the tire is rotating.

In some embodiments, the first magnetic field may be a multipole magnetic field comprising a magnetic field B1 having a characteristic of a first polarity and a magnetic field B2 having a characteristic of a second polarity different from the first polarity, and the magnetic field B1 and magnetic field B2 are alternately arranged each other.

In some embodiments, in performing of the second function, a first case in which the TMS is exposed to the magnetic field B1 more than the magnetic field B2 and a second case in which the TMS is exposed to the magnetic field B2 more than the magnetic field B1 occurs alternately while the TMS rotates along with rotation of the tire.

The method according to an embodiment of the present disclosure may further include identifying, by the main transceiver, a condition of a current used for wireless charging by the TMS according to the second function based on the received second magnetic field, and adjusting, by the main transceiver, a polarity conversion frequency of the first magnetic field according to the identified condition of the current.

In some embodiments, in adjusting of the polarity conversion frequency, the main transceiver may increase the polarity conversion frequency when the identified current condition is lower than a reference value or when a charging voltage of the battery identified according to the second data is maintained for a predetermined time or lower than before.

In some embodiments, the method according to an embodiment of the present disclosure may further include adjusting, by the main transceiver, a polarity conversion frequency of the first magnetic field depending on a rotational speed of the tire identified according to the first data during wireless charging of the battery.

In some embodiments, in adjusting of the polarity conversion frequency, the main transceiver may increase the polarity conversion frequency when the rotational speed of the tire decreases to a reference value or less during wireless charging of the battery.

The present disclosure configured as described above has an advantage in that the battery of the TMS is wirelessly charged by the electromagnetic induction method, and the large induced electromotive force may be generated in the TMS as much as to charge the voltage of the battery more than a predetermined value.

In addition, the present disclosure has an advantage in that the multipole magnetic field is transmitted according to the alternative arrangement of the magnetic field B1 and B2 coils, so that the battery of the TMS can be efficiently charged and the charging speed of the battery can be increased during wireless charging.

In addition, the present disclosure has an advantage in that the magnetic field polarity conversion frequency of the magnetic field can be adjusted according to a condition of battery charging of the TMS or a rotation speed of the tire during wireless charging, so that efficiency and speed of battery charging can be adjusted.

The effects that can be obtained by the present disclosure are not limited to the above-described effects, and other effects that are not described herein will be clearly understood by those skilled in the art from the following description.

BRIEF DESCRIPTION OF THE DRAWINGS

FIG. 5 illustrates a schematic block diagram of a wireless power transmitter 210 and an operation principle.

DETAILED DESCRIPTION

Figure 1:
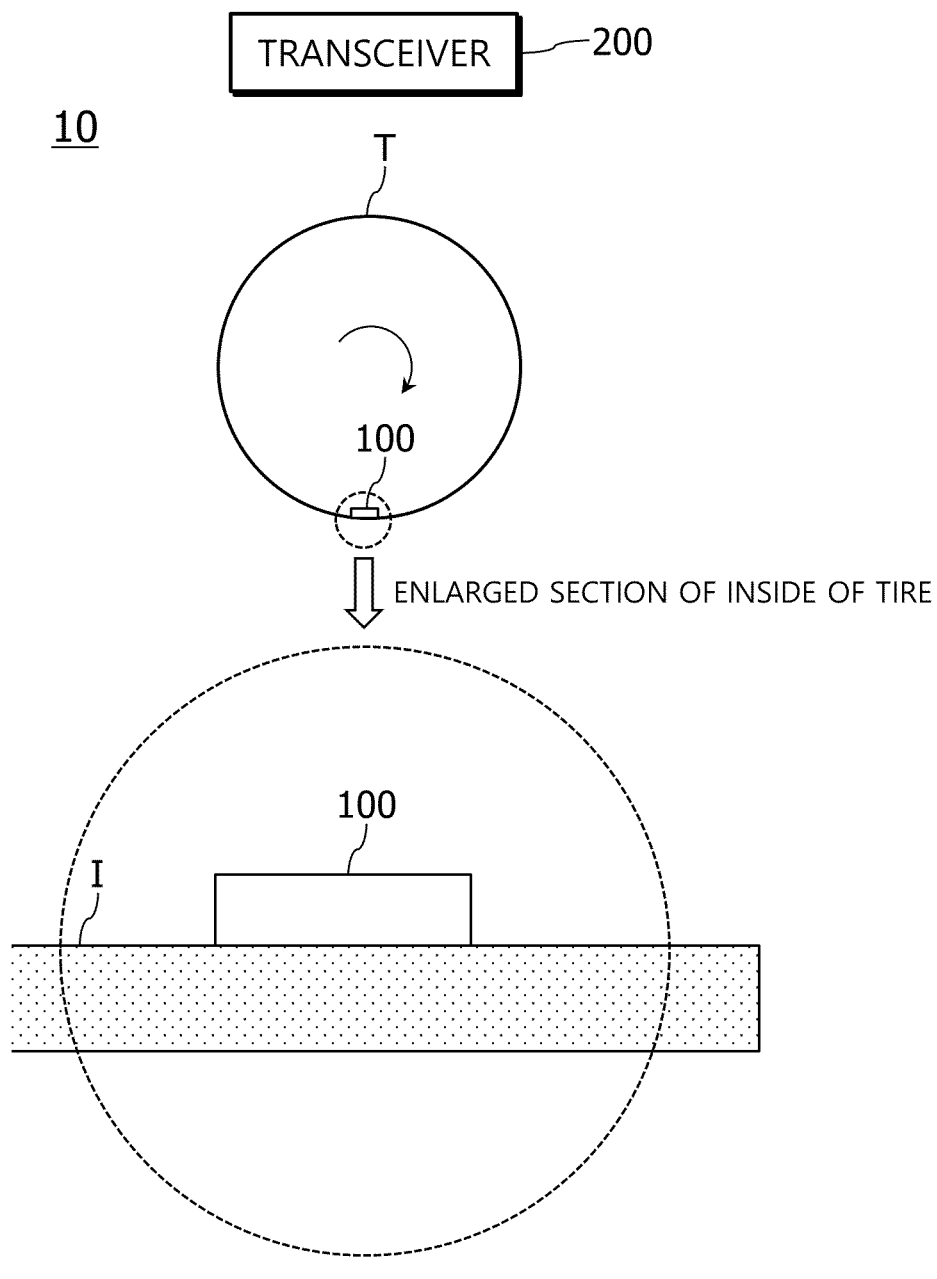
FIG. 1 illustrates a schematic configuration diagram of a system 10 according to an embodiment of the present disclosure.

The above objects, means and advantages of the present disclosure will become more apparent from the following detailed description of the accompanying drawings, and accordingly, those skilled in the art will easily embody the technical idea of the present disclosure. In addition, in the description of the present disclosure, a detailed description of known techniques related to the present disclosure will be omitted when it is determined that the subject matter of the present disclosure may be unnecessarily obscured.

The terminology used herein is for the purpose of describing embodiments and is not intended to limit the present disclosure. In the present specification, the singular forms "a", "an" and "the" are intended to include the plural forms as well, unless otherwise specified. In the present specification, the terms "comprise", "include", "provided with", and "have" do not exclude the presence or addition of one or more other components other than the mentioned components.

In the present specification, the terms "or", "at least one", and the like may indicate one of the words listed together, or may indicate a combination of two or more. For example, "A or B", "at least one of A and B" may include only one of A or B. and may include both A and B.

In the description according to "for example", and the like, the presented information such as the characteristics, variables, or values mentioned may not be exactly consistent, and the embodiments of the present disclosure according to various embodiments of the present disclosure should not be limited by effects such as variations including tolerances, measurement errors, limitations of measurement accuracy, and other commonly known factors.

In the present specification, when an element is described as being "connected to" or "coupled with" another element, it should be understood that the element may be directly connected to or connected to the other element, but other elements may be present in the middle. On the other hand, when an element is described as being "directly connected to" or "directly coupled with" another element, it should be understood that there are no intervening elements.

In the present specification, when an element is described as being "over" or "on top of" another element, it should be understood that the element may be directly engaged or connected to the other element, but other elements may be present in the middle. On the other hand, when an element is described as being "directly on" or "in contact with"

another element, it should be understood that there are no intervening elements. Other expressions for describing a relationship between elements, for example, "between" and "directly between" may be interpreted as well.

In the present specification, the terms "first", "second", and the like may be used to describe various elements, but the elements should not be limited by the above terms. In addition, the above terms should not be interpreted as being used to limit the order of each element, but may be used to distinguish one element from another. For example, the first component may be referred to as the second component, and similarly, the second component may be referred to as the first component.

Unless otherwise defined, all terms used in the specification may be used in their meanings that can be commonly understood by those skilled in the art to which the present disclosure pertains. Further, terms defined in a commonly used dictionary are not interpreted ideally or excessively unless otherwise clearly defined.

Hereinafter, a preferred embodiment of the present disclosure will be described in detail with reference to the accompanying drawings.

Figure 2:
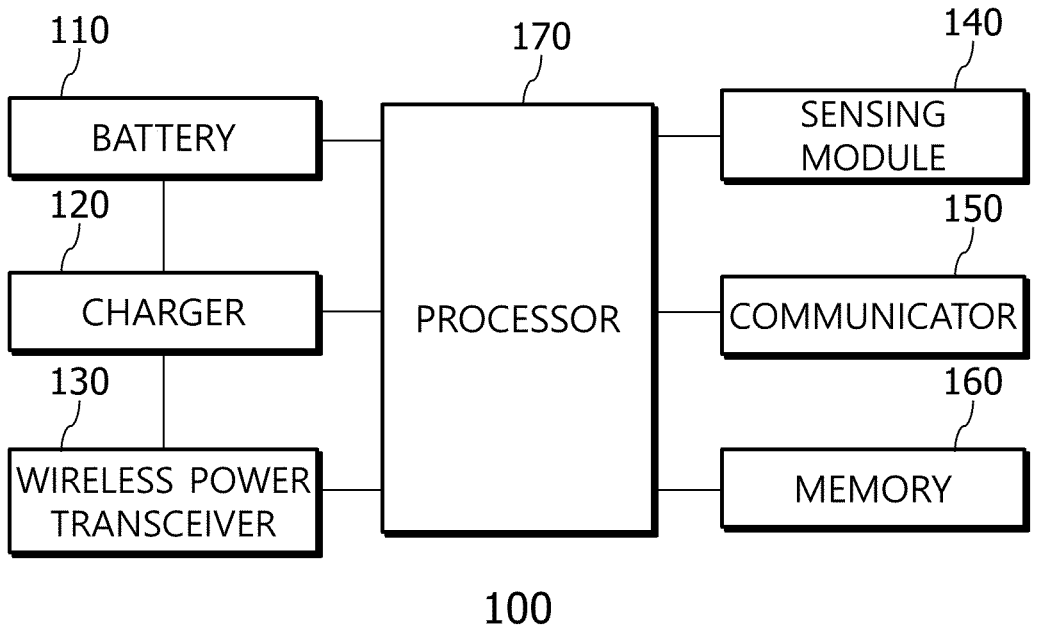
FIG. 2 illustrates a schematic block diagram of a tire monitoring sensor 100.

FIG. 1 illustrates a schematic configuration diagram of a system 10 according to an embodiment of the present disclosure, and FIG. 2 illustrates a schematic block diagram of a tire monitoring sensor 100.

The system 10 according to an embodiment of the present disclosure (hereinafter, referred to as "the system") may be a system provided in a vehicle, and may be a system that senses various conditions (hereinafter, referred to as "tire condition") related to a tire and performs various controls on the vehicle according to a corresponding sensing value.

To this end, referring to FIG. 1, the system 10 includes a tire monitoring sensor (hereinafter, referred to as "TMS") 100 that senses the tire condition. Accordingly, the system 10 may be differently referred to as a "tire monitoring sensor system".

The system 10 includes a transceiver 200 for receiving data on the tire condition detected by the TMS 100 and for transmitting a magnetic field of wireless power so that the battery 110 of the TMS 100 may be wirelessly charged using an electromagnetic induction method. However, in order to distinguish the transceiver 200 from the wireless power transceiver 130 to be described later, the transceiver 200 may be differently referred to as a "main transceiver".

In this case, the TMS 100 and the transceiver 200 are provided at positions spaced apart from each other. That is, the TMS 100 may be mounted on an tire T or an inner portion I of a wheel of the vehicle. On the other hand, the transceiver 200 may be mounted on an inner portion of a tire wheelhouse of the vehicle or the like. Of course, the transceiver 200 is not limited thereto, and the transceiver 200 may be mounted at all positions in the vehicle that enable wireless data communication with the TMS 100 and transmission and reception of a magnetic field for wireless power with the TMS 100. However, when the transceiver 200 is provided on the inner portion of the wheelhouse, wireless data communication with the TMS 100 and transmission and reception of the magnetic field for wireless power with the TMS 100 may be performed without interference.

In particular, the system 10 may control the battery 110 of the TMS 100 to be charged in a wireless charging method using an induced electromotive force generated as the TMS 100 receives the magnetic field for wireless power transfer. In this case, the system 10 may control the TMS 100 to generate a sufficiently large induced electromotive force that allows the battery 110 of the TMS 100 to be charged to a voltage equal to or greater than a predetermined value during wireless charging. In addition, the system 10 may control the charging speed to be increased while the battery 110 of the TMS 100 is efficiently charged during wireless charging. In addition, the system 10 may adjust the charging efficiency and charging speed of the battery 110 of the TMS 100 by adjusting the polarity conversion frequency of the magnetic field according to the charging condition of the battery 110 of the TMS 100 or a rotation speed of the tire during wireless charging.

In this case, the vehicle to which the system 10 is applied may include an autonomous vehicle or an Advanced Driver Assistance System (ADAS), but is not limited thereto. However, in this case, the controller 300 may control a function of the autonomous driving or the ADAS by using the tire condition information sensed by the TMS 100. Here, the ADAS may refer to various types of advanced driver assistance systems.

For example, the ADAS may include an Autonomous Emergency Braking system, a Smart Parking Assistance System (SPAS), a Blind Spot Detection (BSD) system, an Adaptive Cruise Control (ACC) system, a Lane Departure Warning System (LDWS), a Lane Keeping Assist System (LKAS), a Lane Change Assist System (LCAS), and the like, but is not limited thereto.

The TMS 100 is a sensor provided on a tire or wheel and detects a tire condition. That is, the TMS 100 may perform a function (hereinafter, referred to as a "first function") of obtaining sensing data on a condition of the tire and data on a condition (i.e., a charging voltage) of the battery 110 and transmitting the data to the transceiver 200 through wireless data communication. In addition, the TMS 100 may perform a function (hereinafter, referred to as a "second function") of wirelessly charging the battery 110 using a magnetic field-based electromagnetic induction method. That is, the second function may refer to a function of charging the battery 110 using an induced electromotive force generated by receiving a magnetic field transmitted from the transceiver 200 for wireless power transmission according to the electromagnetic induction method. In addition, the TMS 100 may perform a function (hereinafter, referred to as a "third function") of receiving the magnetic field according to the above-described second function and transmitting a magnetic field of feedback thereto to the transceiver 200. The third function may be performed together during a process in which the second function is performed.

For the first to third functions, as shown in FIG. 2, the TMS 100 may include a battery 110, a charger 120, a wireless power transceiver 130, a sensing module 140, a communicator 150, a memory 160, and a processor 170. Each component of the TMS 100 may be manufactured as a package and installed in an inner portion I of the tire or wheel.

The battery 110 provides power required for operation of the TMS 100. The battery 110 is composed of a rechargeable secondary battery. For example, the battery 110 may be a secondary battery such as a nickel cadmium battery, a nickel hydride battery, or a lithium ion battery, but is not limited thereto.

The charger 120 charges the battery 110 using a direct current (DC) transmitted from the wireless power transceiver 130. That is, the battery 110 may be charged according to a circuit operation of the charger 120. Accordingly, the charger 120 may be configured with various circuits required for charging the battery 110. For example, the charger 120 may charge the battery 110 based on a constant current charging method, a constant voltage charging method, a constant power charging method, or a constant current-constant voltage charging method, but is not limited thereto.

Figure 3:
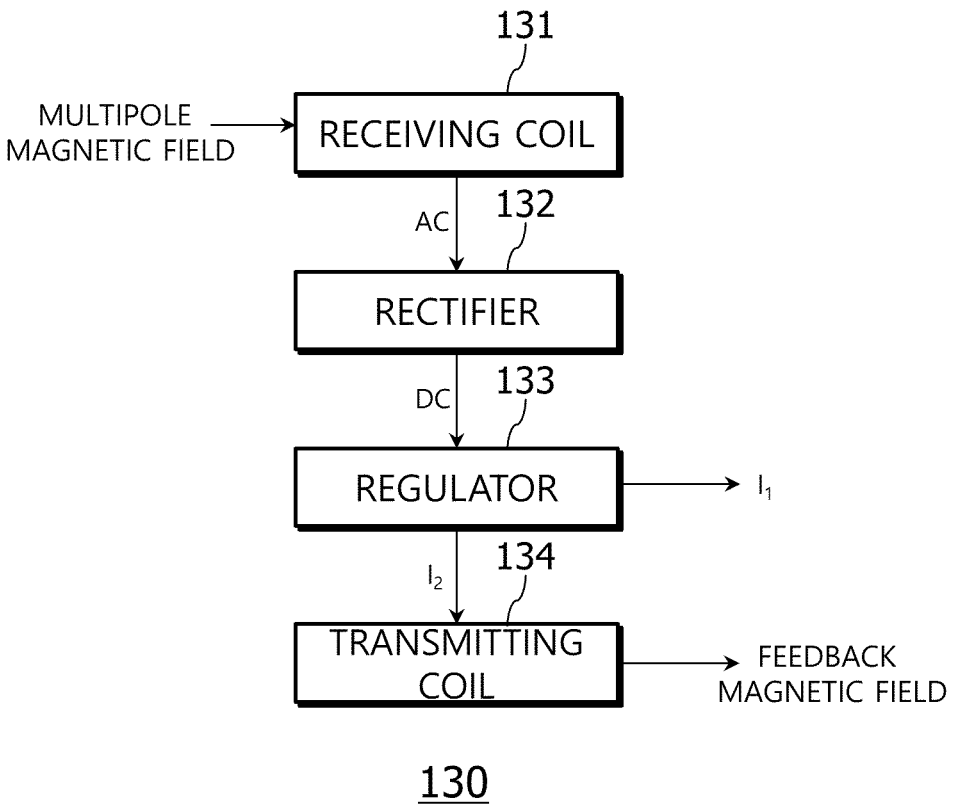
FIG. 3 illustrates a schematic block diagram of a wireless power transceiver 130.

FIG. 3 illustrates a schematic block diagram of the wireless power transceiver 130.

The wireless power transceiver 130 receives a first magnetic field (i.e., the multipole magnetic field) for wireless power transfer transmitted from the transceiver 200, and processes an induced electromotive force generated according to the electromagnetic induction method of the received first magnetic field. To this end, as shown in FIG. 3, the wireless power transceiver 130 may include a receiving coil 131, a rectifier 132, and a regulator 133. In addition, the wireless power transceiver 130 may transmit the second magnetic field (i.e., the feedback magnetic field) to the transceiver 200. To this end, the wireless power transceiver 130 may further include a transmitting coil 134.

The receiving coil 131 is a component for receiving the first magnetic field (i.e., the multipole magnetic field) transmitted from the transceiver 200. That is, the receiving coil 131 induces an alternating current (AC) current (voltage) while generating an induced electromotive force according to the received first magnetic field. In this case, as magnitude and change of the received first magnetic field increase, the alternating current (AC) current (voltage) induced by the receiving coil 131 increases.

The rectifier 132 converts the alternating current (AC) into a direct current (DC) (hereinafter, referred to as "first direct current") through a rectifying operation on the alternating current (AC) induced by the receiving coil 131. To this end, the rectifier 132 may include a diode. For example, the rectifier 132 may include a half-wave rectifying circuit, a radio wave rectifying circuit, a bridge rectifying circuit, or a peak rectifying circuit, but is not limited thereto.

The regulator 133 converts the first direct current converted by the rectifier 132 into a direct current (hereinafter, referred to as "second direct current") of a predetermined magnitude. That is, the regulator 133 may perform a smoothing operation to remove ripples from the first direct current, and may maintain the direct current at a desired specific size value (voltage value, etc.). For example, the regulator 133 may be a linear or switching regulator, but is not limited thereto.

Meanwhile, the current according to the second direct current converted through the regulator 133 may be used as the current $I_1$ for operating the TMS 100 or transmitted to the charger 120 to charge the battery 110. In addition, the current according to the second direct current may be transmitted to the transmitting coil 134 and may be used as the current $I_2$ for generating the feedback magnetic field. That is, the transmitting coil 134 generates the feedback magnetic field using $I_2$ and transmits the generated feedback magnetic field to the transceiver 200. In this case, $I_2$ has a positive correlation or a proportional relationship with $I_1$. The positive correlation refers to a relationship in which $I_2$ increases as $I_1$ increases and $I_2$ decreases as $I_1$ decreases.

That is, the second magnetic field (i.e., the feedback magnetic field) generated by the transmitting coil 134 may have a correlation with $I_2$. For example, as the alternating current (AC) induced in the receiving coil 131 by the first magnetic field (i.e., the multipole magnetic field) transmitted from the transceiver 200 increases, $I_1$ and $I_2$ also increase, accordingly, the second magnetic field (i.e., the feedback magnetic field) generated by the transmitting coil 134 may also be large. The transceiver 200 receiving the feedback magnetic field may analyze a magnitude of the signal induced by the feedback magnetic field to identify the condition i.e., magnitude of the charging current $I_1$ of the battery 110 currently being wirelessly charged in the TMS 100 by the first magnetic field (i.e., a multipole magnetic field) transmitted by the transceiver 200.

In this way, the transmitting coil 134 generates the second magnetic field capable of feeding back a characteristic of a charging current $I_2$ according to wireless charging at the TMS 100 side performed according to electromagnetic induction by the first magnetic field (i.e., the multipole magnetic field) transmitted from the transceiver 200, and transmits the second magnetic field to the transceiver 200 side, the corresponding second magnetic field may be referred to as the "feedback magnetic field". The second magnetic field (i.e., the feedback magnetic field) is not generated using power pre-stored in the battery 110 of the TMS 100, but is generated using power generated by the electromagnetic induction of the first magnetic field (i.e., the multipole magnetic field).

The sensing module 140 is a module for detecting a tire condition of a vehicle. For example, the sensing module 140 may include a pressure sensing module (not shown) (e.g., a TPMS IC, or the like) for measuring a pressure of the tire. Of course, the sensing module 140 may further include a module for detecting various other conditions of the tire in addition to the pressure of the tire.

The communicator 150 is a component for performing data communication with another device such as the transceiver 200. For example, the communicator 150 may transmit data such as the sensed tire condition to the transceiver 20 or the like. In this case, the communicator 150 may perform wireless communication such as Bluetooth.

The memory 160 may store a program and various data for operating the processor 170, and may store a program related to a control method to be described later. For example, the memory 160 may include a volatile memory such as DRAM or SRAM, or a non-volatile memory such as PRAM, MRAM, ReRAM, ROM. EPROM, flash memory, or the like, or may include a hard disk drive (HDD), a solid state drive (SSD), or the like, but is not limited thereto.

The processor 170 controls the operation of the TMS 100. That is, the processor 170 may control the execution of the first to third functions. The processor 170 may control the execution of the control method to be described later.

Figure 4:
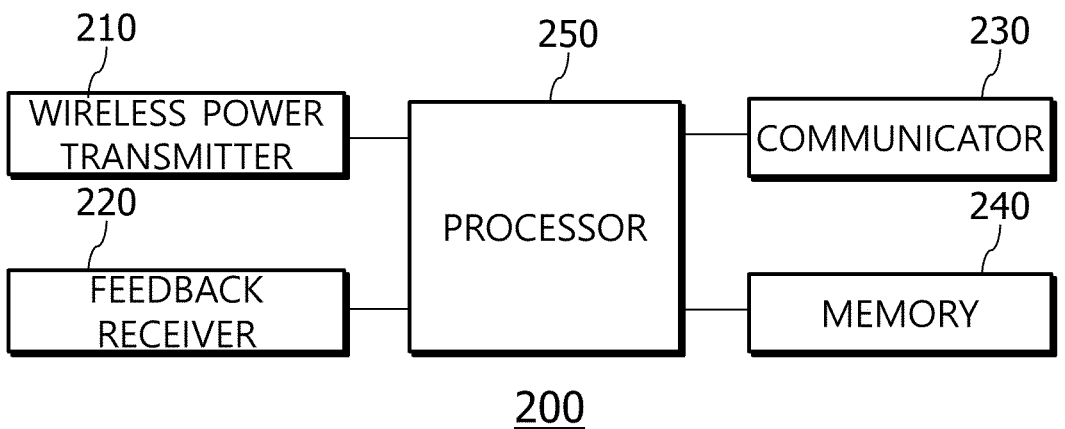
FIG. 4 illustrates a schematic block diagram of a transceiver 200.

FIG. 4 illustrates a schematic block diagram of the transceiver 200.

The transceiver 200 may receive data about the tire condition detected in the TMS 100 according to the first function of the TMS 100 through wireless communication. In addition, the transceiver 200 may transmit the first magnetic field (i.e., the multipole magnetic field) of the wireless power for the second function of the TMS 100 to the TMS 100 side. That is, the transceiver 200 generates the first magnetic field for transmitting the wireless power of the TMS 100 to enable the battery 110 to be wirelessly charged in an electromagnetic induction method. In addition, the transceiver 200 may receive the second magnetic field (i.e., the feedback magnetic field) from the TMS 100 according to the third function of the TMS 100, and may identify the current condition according to the wireless charging in the TMS 100 using the received feedback magnetic field. In this case, the transceiver 200 may adjust the efficiency and speed of wireless charging of the battery 110 of the TMS 100 by adjusting characteristics (e.g., the polarity conversion frequency, etc.) of the first magnetic field (i.e., the multipole magnetic field) of the wireless power transmitted for the second function of the TMS 100 according to the identified current condition.

To this end, as shown in FIG. 4, the transceiver 200 may include a wireless power transmitter 210, a feedback receiver 220, a communicator 230, a memory 240, and a processor 250.

Figure 6:
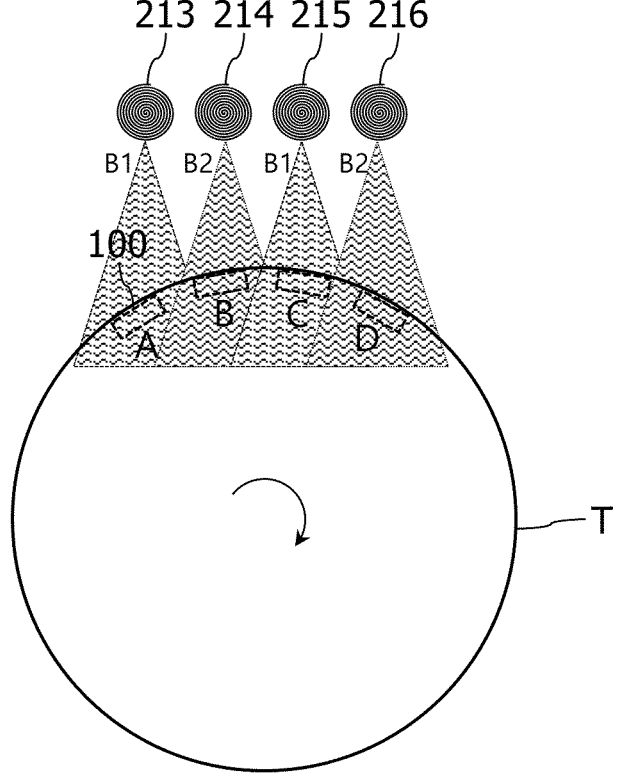
FIG. 6 illustrates a conceptual diagram of the influence of a TMS 100 by a multipole magnetic field transmitted from a plurality of coils 213 to 216 of a wireless power transmitter 210.

FIG. 5 illustrates a schematic block diagram of the wireless power transmitter 210 and an operation principle, and FIG. 6 illustrates a conceptual diagram of the influence of the TMS 100 by the multipole magnetic field transmitted from the plurality of coils 213 to 216 of the wireless power transmitter 210.

The wireless power transmitter 210 is a configuration in which the transceiver 200 generates the first magnetic field (i.e., the multipole magnetic field) of wireless power for the second function of the TMS 100 and transfers it to the TMS 100 side. To this end, as shown in FIG. 5, the wireless power transmitter 210 includes an inverter 211, a phase converter 212, and a plurality of coils 213 to 216.

The inverter 211 converts a DC voltage (current) into an AC voltage (current). The inverter 211 includes a plurality of switching elements, and by controlling on/off timing of each switching element to which a DC voltage (current) is applied, the corresponding DC may be converted into AC1. For example, each switching element may be implemented by combining a MOSFET and a diode, but is not limited thereto. In this case, control of the on/off of each switching element may be performed by the processor 250.

The phase converter 212 converts the phase of the signal for AC1 converted by the inverter 211. As an example, the phase converter 212 may convert its phase by 180° to reverse the signal, but is not limited thereto. That is, the phase converter 212 receives the AC1 of the inverter 212 and outputs the AC2 which is phase-converted with respect to the corresponding AC1. In this case, AC1 and AC2 correspond to alternating currents having different phases at the same time point.

The plurality of coils 213 to 216 generate a magnetic field B1 by receiving an AC1 converted in the inverter 211 in a part, and generate a magnetic field B2 by receiving an AC2 phase-converted in the phase converter 212 in the remainder. In this case, it may be preferable that the coil generating B1 (hereinafter, referred to as "B1 coil") and the coil generating B2 (hereinafter, referred to as "B2 coil") are alternately arranged each other (hereinafter, referred to as "alternately arranged").

For example, as shown in FIGS. 4 and 5, when the coil B1 is the first and third coils 213 and 215 and the coil B2 is the second and fourth coils 214 and 216, the coils B1 and B2 may be alternately arranged in the order of the first coil 213, the second coil 214, the third coil 215, and the fourth coil 216. Accordingly, since the first magnetic field in which the B1 and B2 having different polarities are alternately arranged is generated, the first magnetic field may be referred to as a "multipole magnetic field".

That is, according to the alternative arrangement, as illustrated in FIG. 6, when the TMS 100 rotating together according to the rotation of the tire T of the vehicle receives the first magnetic field, the TMS 100 may alternately receive the B1 and B2 having different polarities.

Specifically, in FIG. 6, t1 to t4 are times, t1<t2<t3<t4, and A to D are different positions capable of receiving a first magnetic field, respectively. In other words, according to the rotation of the tire T. The TMS 100 is sequentially located in A at t1, in B at t2, in C at t3, and in D at t4, respectively.

In A, a first case is generated in which the TMS 100 mainly receives (i.e., more) B1 while being exposed to B1 more than B2 in the first magnetic field, and in B a second case is generated in which the TMS 100 mainly receives B2 while being exposed to B2 more than B1 in the first magnetic field. Then, in the TMS 100, the first case is generated in C and the second case is generated in D. That is, the first case and the second case are alternately generated according to time.

Accordingly, the TMS 100 alternately receives B1 and B2 according to time. In this case, since B1 and B2 are magnetic fields having different polarities, the TMS 100 that alternately receives them is exposed to a more varied magnetic field environment. As a result, in the receiving coil 131 of the TMS 100 that sequentially receives the multipolar characteristic magnetic field according to the alternative arrangement, induced electromotive force of AC is generated larger than when a simple magnetic field is received, and thus charging efficiency of the battery 110 may be increased. In particular, this effect can be further enhanced when the phase converter 212 outputs AC2 phase-converted by 180° relative to AC1 such that B1 and B2 are magnetic fields with opposite polarities.

Figure 7:
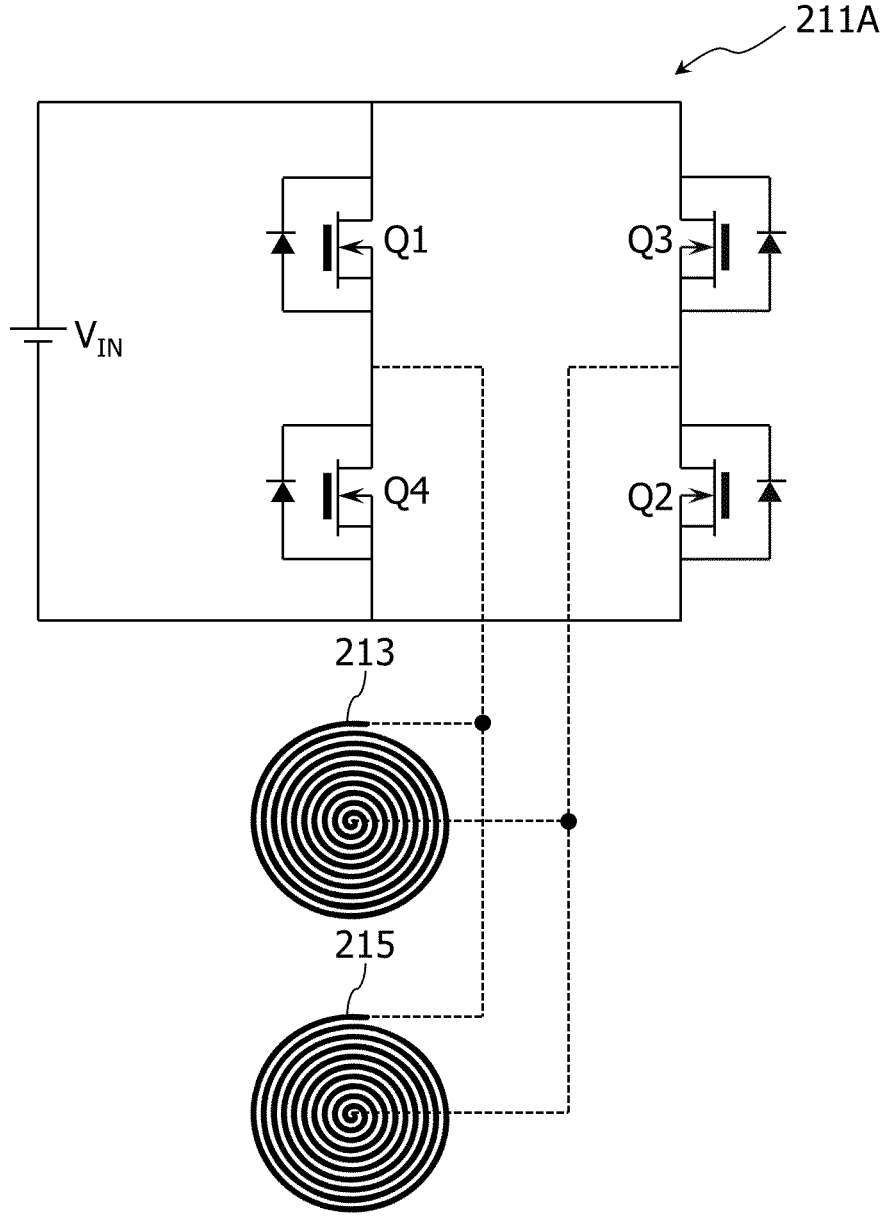
FIG. 7 illustrates an example of first and third coils 213 and 215 and a first configuration 211A of a inverter 211.
Figure 8:
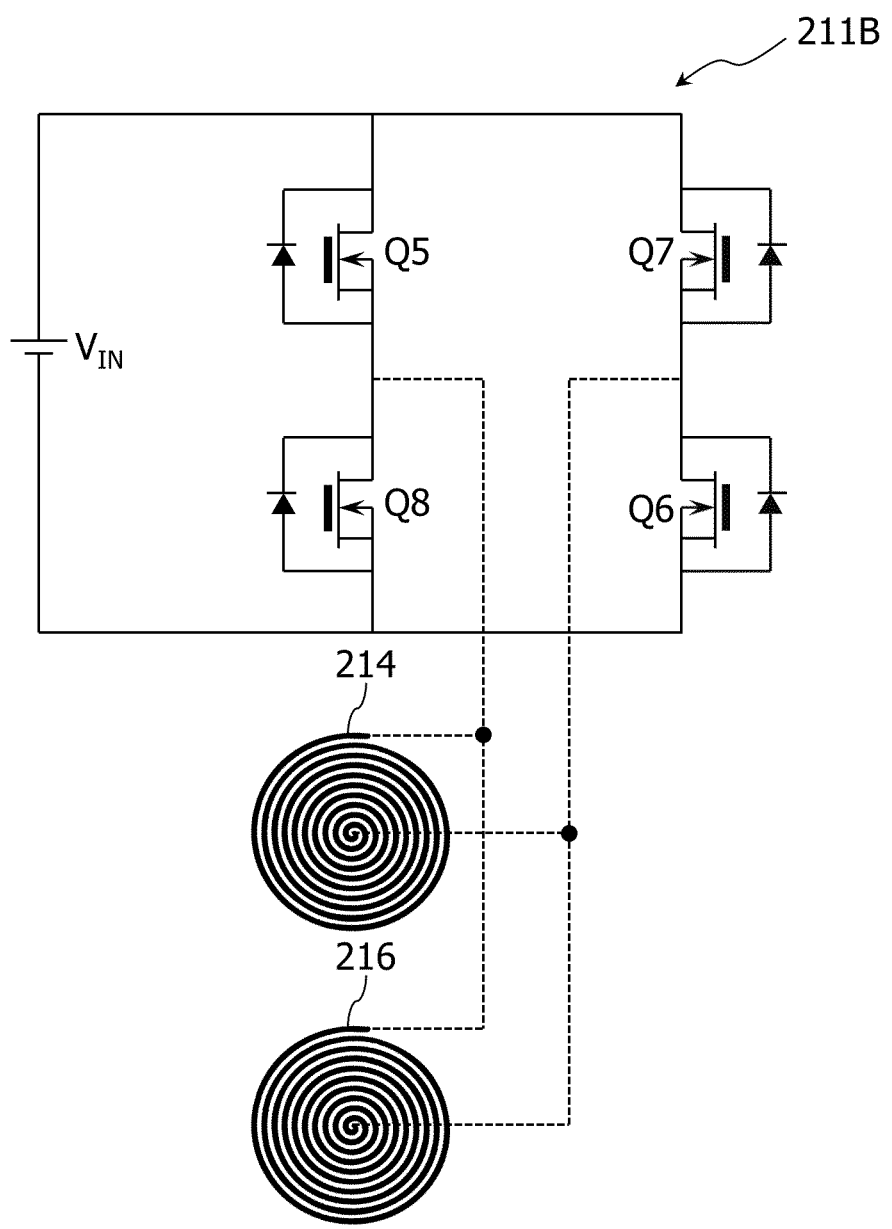
FIG. 8 illustrates an example of second and fourth coils 214 and 216 and a second configuration 211B of a inverter 211.

FIG. 7 illustrates an example of the first and third coils 213 and 215 and the first configuration 211A of the inverter 211, and FIG. 8 illustrates an example of the second and fourth coils 214 and 216 and the second configuration 211B of the inverter 211.

For example, as illustrated in FIGS. 7 and 8, the inverter 211 may include the first and second configurations 211A and 211B.

Referring to FIG. 7, the first configuration 211A includes a plurality of switching elements Q1 to Q4. In this case, the Q1 and Q4 are connected in series, the Q3 and Q2 are connected in series, and the Q3 and Q2 are connected in parallel to the Q1 and Q4. That is, one end of the DC voltage source $V_{IN}$ is connected to one end of the Q1 and Q3 respectively, and the other end of the DC voltage source $V_{IN}$ is connected to the other end of the Q4 and Q2, respectively.

The one end of the B1 coil is connected between the Q1 and Q4 (i.e., the other end of the Q1 and the one end of the Q4). That is, one end of the first and third coils 213 and 215 is connected between the Q1 and Q4. In addition, one end of the B2 coil is connected between the Q3 and Q2 (i.e., the other end of the Q3 and one end of the Q2). That is, the other end of the first and third coils 213 and 215 are connected between the Q3 and Q2.

Similarly, referring to FIG. 7, the second configuration 211B includes a plurality of switching elements Q5 to Q8. In this case, the Q5 and Q8 are connected in series, the Q7 and Q6 are connected in series, and the Q7 and Q6 are connected in parallel to the Q5 and Q8. That is, one end of the DC voltage source Vs is connected to one end of the Q5 and Q7, respectively, and the other end of the DC voltage source $V_{IN}$ is connected to the other end of the Q8 and Q6, respectively.

The one end of the B1 coil is connected between the Q5 and Q8 (i.e., the other end of the Q5 and the one end of the Q8). That is, one end of the first and third coils 213 and 215 is connected between the Q5 and Q8. In addition, one end of the B2 coil is connected between the Q7 and Q6 (i.e., the other end of the Q7 and the one end of the Q6). That is, the other end of the first and third coils 213 and 215 are connected between the Q7 and Q6.

Figure 9:
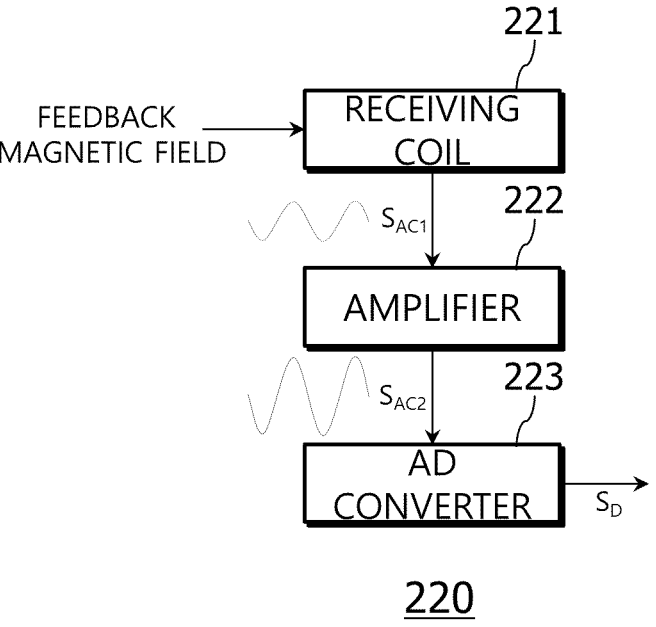
FIG. 9 illustrates a schematic block diagram of a feedback receiver 220.

FIG. 9 illustrates a schematic block diagram of the feedback receiver 220.

The feedback receiver 220 receives the second magnetic field (i.e., the feedback magnetic field) transmitted from the TMS 100 and transmits a signal $S_D$ generated by the received second magnetic field to the processor 250.

To this end, as shown in FIG. 9, the feedback receiver 220 may include a receiving coil 221, an amplifier 222, and an AD converter 223.

The receiving coil 221 is configured to receive the second magnetic field (i.e., the feedback magnetic field) transmitted from the TMS 100. That is, the receiving coil 221 generates an alternating current (AC) current (voltage) signal $S_{AC1}$ while an induced electromotive force is generated according to the received second magnetic field. In this case, as the magnitude and the change of the received second magnetic field increase, the $S_{AC1}$ generated from the receiving coil 221 is larger.

However, the $S_{AC1}$ has a relatively small signal size for analysis. Accordingly, the amplifier 222 amplifies the $S_{AC1}$ induced from the receiving coil 221. That is, the amplifier 222 may output a $S_{AC2}$ amplified by the $S_{AC1}$ to have a larger amplitude than the $S_{AC1}$. For example, the amplifier 222 may be implemented as an Op-Amp, but is not limited thereto.

In this case, the amplified signal $S_{AC2}$ is an analog signal. However, it is advantageous for analysis of the corresponding signal to convert the analog signal into a digital signal. Accordingly, the AD converter 223 converts the amplified signal $S_{AC2}$, which is the analog signal, into a digital signal $S_D$. The $S_D$ converted into the digital signal is transmitted to the processor 260.

The communicator 230 is configured to perform data communication with another device such as the TMS 100. For example, the communicator 230 may receive data such as a tire condition detected and transmitted by the TMS 100. In this case, the communicator 230 may perform wireless communication such as Bluetooth.

The memory 160 may store a program and various data for operating the processor 170, and may store a program related to a control method to be described later. For example, the memory 160 may include a volatile memory such as DRAM or SRAM, or a non-volatile memory such as PRAM, MRAM. ReRAM. ROM. EPROM, flash memory, or the like, or may include a hard disk drive (HDD), a solid state drive (SSD), or the like, but is not limited thereto.

The processor 250 controls the operation of the transceiver 200. That is, the processor 250 may control the execution of the transceiver 200 related to the first to third functions. That is, the processor 250 may control the execution of the control method to be described later.

That is, the processor 250 may control the communicator 230 to receive data about the tire condition detected in the TMS 100 according to the first function of the TMS 100 through wireless communication. In addition, the processor 250 may control the operation of the wireless power transmitter 210 to transmit the first magnetic field (i.e., the multipole magnetic field) of the wireless power for the second function of the TMS 100 to the TMS 100 side.

In addition, when the feedback receiver 220 receives the second magnetic field (i.e., the feedback magnetic field) from the TMS 100 according to the third function of the TMS 100 and transmits the $S_D$, which is a signal according to the received second magnetic field, the processor 250 may identify the current condition according to the wireless charging in the TMS 100 using the corresponding $S_D$. That is, the processor 250 may identify the condition, i.e., a magnitude, of the charging current $I_1$ of the battery 110 currently being wirelessly charged in the TMS 100 by the first magnetic field (i.e., the multipole magnetic field) transmitted from the transceiver 200 by analyzing the $S_D$. In this case, the processor 250 may control the characteristic (e.g., the polarity conversion frequency) of the first magnetic field (i.e., the multipole magnetic field) of the wireless power transmitted for the second function of the TMS 100 to be changed according to the identified current condition.

Hereinafter, a control method according to an embodiment of the present disclosure will be described.

Figure 10:
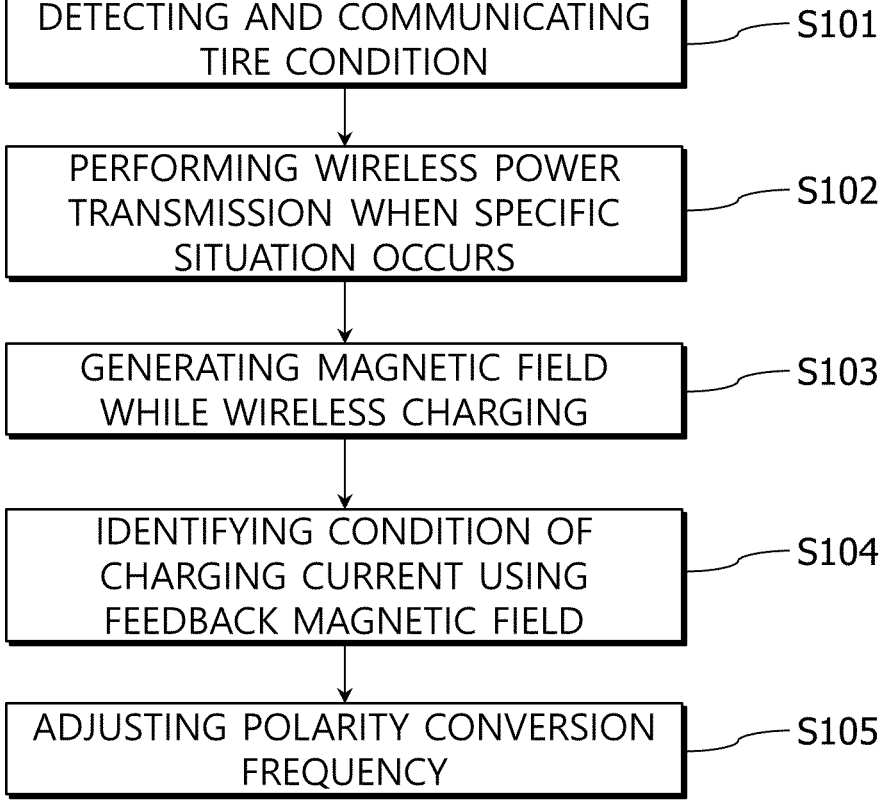
FIG. 10 illustrates a schematic flowchart of a control method according to an embodiment of the present disclosure.

FIG. 10 illustrates a schematic flowchart of a control method according to an embodiment of the present disclosure.

A control method according to an embodiment of the present disclosure (hereinafter, referred to as "the control method") may be performed in the TMS 100 and the transceiver 200 as a control method for performing the first to third functions. Referring to FIG. 10, the control method includes Step 101 to Step 105. Such Step 101 to Step 105 may be performed under the control of the processors 170 and 250 of the TMS 100 and the transceiver 200.

First, the processor 170 controls the TMS 100 to perform the first function. That is, the processor 170 may control the TMS 100 to obtain sensing data (hereinafter, referred to as "first data") on the tire condition (e.g., pressure, temperature, acceleration, etc.) of the vehicle and data (hereinafter, referred to as "second data") on the condition (i.e., charging voltage, etc.) of the battery 110 and transmit the obtained data to the transceiver 200 through wireless data communication (Step 101).

For example, the processor 170 may obtain the first data through the sensing module 140 and may obtain the second data through a voltage sensing module (not shown) of the battery 110. Further, wireless communication for the first and second data may be performed through the communicators 150 and 230.

However, when the pressure of the tire T decreases to a predetermined pressure or less as a result of the analysis of the received first data, the processor 250 may transmit a warning notification signal for the tire T to an output part of the vehicle that outputs the warning notification signal as a visual or audible signal or to another controller (not shown) in the vehicle that controls the output part.

As an example, the output part may include a speaker, a display panel, or other various output devices, but is not limited thereto. Further, when the output part includes a display panel, the display panel may be combined with an input part to be implemented as a touch screen or the like. Operations of the input part and the output part may be controlled by the controller 150.

In addition, when a specific situation occurs as a result of the analysis of the received first and second data, the processor 250 controls the wireless power transmitter 210 to perform wireless power transmission (Step 102). That is, the processor 250 may control the wireless power transmitter 210 to generate the first magnetic field.

In this case, the specific situation may include a situation in which the tire T rotates. This is because the battery 110 of the TMS 100 can be wirelessly charged while the TMS 100 receives the first magnetic field in a changed condition only when the tire T rotates. In this case, the processor 250 may analyze acceleration data of the tire T included in the first data and determine whether the tire T rotates.

Further, the specific situation may include a case in which the charging voltage of the battery 110 decreases to a predetermined value or less (i.e., a reference value or less) and thus wireless charging is required. In this case, the processor 250 may analyze the condition data of the battery 110 based on the second data and determine whether the charging voltage of the battery 110 is a reference value or less.

When such a specific situation occurs, the processor 250 controls ON/OFF of each switching element of the inverter 211 so that AC1 converted from a signal of a DC voltage $V_{IN}$ to a signal of an AC voltage is provided to the B1 coil. That is, the AC1 may be provided to the first and third coils 213 and 215. At the same time, the AC2 that is a signal of the AC voltage phase-converted with respect to the AC1, is provided to the B2 coil while the phase converter 212 operates. That is, the AC2 may be provided to the second and fourth coils 214 and 216. Accordingly, the first magnetic field (i.e., a multipole magnetic field) in which the B1 and B2 having different polarities are alternately operated according to the alternative arrangement may be generated from the wireless power transmitter 210.

However, the configuration and function of the wireless power transmitter 210 for performing the Step 102 are the same as described above based on FIGS. 5 to 8, and thus will be omitted hereinafter.

Thereafter, the wireless power transceiver 130 of the TMS 100 generates the second magnetic field (i.e., the feedback magnetic field) while performing wireless charging according to the electromagnetic induction method of the corresponding first magnetic field while receiving the first magnetic field transmitted from the transceiver 200 (Step 103).

That is, the AC current (voltage) is induced while the induced electromotive force is generated according to the first magnetic field received by the receiving coil 131, and rectification and smoothing are performed by the rectifier 132 and the regulator 133 with respect to the AC, and the AC is converted into first and second direct current DC. In addition, the current according to the second direct current DC is transmitted to the charger 120 and used as a current $I_1$ for charging the battery 110, and simultaneously transmitted to the transmitting coil 134 and used as a current $I_2$ for generating the second magnetic field (i.e., the feedback magnetic field). As a result, the transmitting coil 134 may generate the second magnetic field (i.e., the feedback magnetic field) that enables the condition i.e., magnitude of the charging current $I_1$ of the battery 110 that is induced and used according to the first magnetic field, to be identified.

However, since the configuration and functions of the wireless power transceiver 130 for performing the Step 103 are described above based on FIG. 3, the description will be omitted hereinafter.

Thereafter, the feedback receiver 220 of the transceiver 200 may receive the second magnetic field transmitted from the TMS 100 and transmit the signal $S_D$ generated by the corresponding second magnetic field to the processor 250, and the processor 250 may identify the current condition according to the wireless charging in the TMS 100 using the transmitted $S_D$ (Step 104). That is, the processor 250 may analyze the $S_D$ to identify the condition of the current $I_1$ for charging the battery 110 currently being wirelessly charged in the TMS 100 by the first magnetic field (i.e., the multipole magnetic field) transmitted from the transceiver 200.

However, since the configuration and functions of the feedback receiver 220 for performing the Step 104 are described above based on FIG. 9, the description will be omitted hereinafter.

Thereafter, the processor 250 may control the characteristic (i.e., the polarity conversion frequency) of the first magnetic field (i.e., the multipole magnetic field) of the wireless power transmitted for the second function of the TMS 100 to be changed according to the identified current condition (Step 105).

Figure 11:
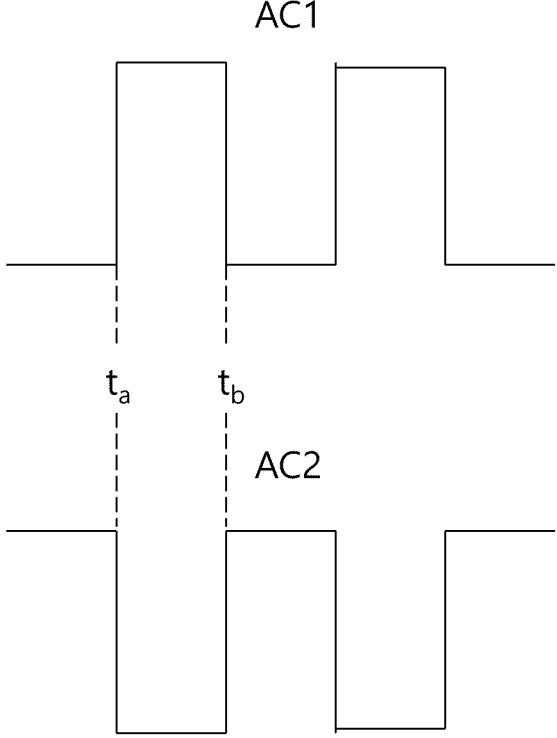
FIG. 11 illustrates an example of AC1/AC2 that are an alternating current AC signal changed over time, in more detail.

FIG. 11 illustrates an example of AC1/AC2 that are an alternating current AC signal changed over time, in more detail.

At this time, the polarity conversion frequency refers to the number of times the polarity of the magnetic fields of B1 and B2 are converted during a unit time (e.g., 1 second). That is, the polarity of the magnetic fields of the B1 and B2 is changed according to the change of the AC1 and AC2 that are the alternating current AC signal.

Referring to FIG. 11, in the case of the AC1, in $t_a$, the AC1 is changed from low to high, and in $t_b$, the AC1 is changed from high to low. In addition, in the case of the AC2 phase-shifted by 180°, in $t_a$, the AC2 is changed from high to low, and in $t_b$, the AC2 is changed from low to high.

In this case, the B1 may have a magnetic field direction oriented in a first direction at $t_a$, and may have a magnetic field direction oriented in a second direction (opposite to the first direction) at $t_b$. On the contrary, the B2 may have a magnetic field direction oriented in a second direction at $t_a$, and may have a magnetic field direction oriented in a first direction at $t_b$. Such a change in the direction of the magnetic field may be referred to as a change in the polarity of the magnetic field, and the degree of such a change in polarity may be represented by a polar conversion frequency. Accordingly, the alternating current frequency of the AC1/AC2 have a proportional relationship or a positive correlation with the polarity conversion frequency of the B1/B2.

In particular, when the polarity conversion frequency for the first magnetic fields of the B1 and B2 are adjusted, the induced electromotive force of the TMS 100 receiving the polarity conversion frequency may also vary. That is, as the corresponding polarity conversion frequency increases, the change of the first magnetic field increases, and thus the induced electromotive force in the TMS 100 receiving the first magnetic field may also increase. That is, the corresponding polarity conversion frequency has the proportional relationship or the positive correlation with respect to the induced electromotive force of the TMS 100.

For example, a case in which the current condition identified in Step 104 is lower than the reference value and thus a higher charging current $I_1$ is required at the TMS 100, a case in which the charging voltage of the battery 110 according to the second data received in Step 101 decreases as time increases, or a case in which the charging voltage does not increase and continues to be maintained for a predetermined time, etc., may occur. In this case, the processor 250 may control the polarity conversion frequency of the first magnetic field to be increased. That is, the processor 250 may control the period of on/off of each switching element of the inverter 211 so that the AC1/AC2 of an AC frequency higher than before are generated.

Accordingly, the TMS 100 receiving the first magnetic field changed more than before may charge the battery 110 using the charging current $I_1$ higher than before. As a result, a large induced electromotive force may be generated in the TMS 100 as much as to increase the charging voltage of the battery 110 more than before, and the charging speed may be increased.

In addition, in Step 105, the processor 250 may control the polarity conversion frequency of the first magnetic field to be changed according to the rotation speed of the tire T according to the first data received in Step 101 during the wireless charging of the battery 110.

That is, when the rotation speed of the tire T decreases to a reference value or less during wireless charging, even if the first magnetic field of the same magnitude is received, a lower induced electromotive force is generated in the TMS

100. This is because the lower the rotation speed, the less changed first magnetic field is received in the TMS 100.

For example, when the rotation speed of the tire T according to the first data received in Step 101 is lower than the reference value, the processor 250 may control the polarity conversion frequency of the first magnetic field to be increased. That is, the processor 250 may control the period of on/off of each switching element of the inverter 211 so that the AC1/AC2 of AC frequency higher than before are generated.

Accordingly, the TMS 100 receiving the first magnetic field changed more than before may charge the battery 110 using the charging current $I_1$ higher than before. As a result, a large induced electromotive force may be generated in the TMS 100 as much as to increase the charging voltage of the battery 110 more than before, and the charging speed may be increased.

The present disclosure has an advantage in that the battery 110 of the TMS 100 is wirelessly charged by an electromagnetic induction method, and a large induced electromotive force may be generated in the TMS 100 as much as to charge the voltage of the battery 110 by a predetermined value or more. In addition, the present disclosure has an advantage of efficiently charging the battery 110 of the TMS 100 during wireless charging and increasing a charging speed by transmitting the multipole magnetic field according to the alternative arrangement of the B1 and B2 coils. In addition, the present disclosure has an advantage of adjusting efficiency and speed of battery charging by adjusting the polarity conversion frequency of the multipole magnetic field according to the charging condition of the battery 110 of the TMS 100 or a rotation speed of the tire during wireless charging.

Although the present disclosure has been described in detail with reference to specific embodiments, it is to be understood that various modifications are possible without departing from the scope of the present disclosure. Therefore, the scope of the present disclosure is not limited to the described embodiments, but should be defined by the following claims and equivalents thereto.

10: System
100: Tire Monitoring Sensor (TMS)
110: battery
120: charger
130: wireless power transceiver
131: receiving coil
132: rectifier
133: regulator
134: transmitting coil
140: sensing module
150, 230: communicator
160, 240: memory
170, 250: processor
200: transceiver
210: wireless power transmitter
211: inverter
212: phase converter
213: first coil
214: second coil
215: third coil
216: fourth coil
220: feedback receiver
221: receiving coil
222: amplifier

17

What is claimed is:

1. A system provided in a vehicle, the system comprising:
   a tire monitoring sensor (TMS) comprising a battery and mounted on a tire or wheel of the vehicle, and detecting a condition of the tire; and
   a main transceiver provided at a position spaced apart from the TMS in the vehicle,
   wherein the main transceiver comprises a plurality of coils configured to generate first magnetic fields by application of an alternating current,
   wherein the plurality of coils is disposed such that the first magnetic fields are applied to the TMS sequentially according to a rotation of the tire or the wheel, and
   wherein the alternating current is applied to the plurality of coils such that adjacent first magnetic fields have opposite phases.

2. The system of claim 1, wherein the TMS further comprises a transmitting coil configured to generate a second magnet field, the second magnetic field being generated by application of a portion of an induced current by the first magnetic fields,
   wherein the main transceiver further comprises a feedback receiver including a receiving coil, and
   wherein the second magnetic field is applied to the receiving coil.

3. The system of claim 1, wherein the plurality of coils include four coils sequentially arranged along a rotation direction of the wheel.

4. The system of claim 1, wherein the TMS is more strongly influenced by one of the first magnetic fields than by the other first magnetic fields during a portion of rotation of the tire or the wheel in which the TMS passes through a region in which the first magnetic fields are present.

5. The system of claim 1, wherein the main transceiver further comprises:
   an inverter for converting a direct current DC to the AC1; and
   a phase converter for phase-converting the AC1 to the AC2.

6. The system of claim 5, wherein the AC1 has a phase difference of 1800 with the AC2.

7. The system of claim 2, wherein the main transceiver is configured to:
   identify a condition of a current used for wireless charging by the TMS based on the received second magnetic field, and
   adjust a polarity conversion frequency of the first magnetic fields according to the identified condition of the current.

8. The system of claim 7, wherein the main transceiver increases the polarity conversion frequency when the identified current condition is lower than a reference value or when a charging voltage of the battery is maintained for a predetermined time or lower than before.

9. The system of claim 1, wherein the main transceiver adjusts a polarity conversion frequency of the first magnetic fields depending on a rotational speed of the tire during wireless charging of the battery.

10. The system of claim 9, wherein the main transceiver increases the polarity conversion frequency when the rotational speed of the tire decreases to a reference value or less during wireless charging of the battery.

11. A method for controlling a system comprising a tire monitoring sensor (TMS) having a battery and mounted on a tire or wheel of a vehicle, and detecting a tire condition, and a main transceiver provided at a position spaced apart from the TMS in the vehicle and including a plurality of coils, the method comprising:
   rotating the wheel of the vehicles;
   generating a first alternating current and a second alternating current the second alternating current having a phase opposite to the first alternating current; and
   applying the first alternating current and the second alternating current to the plurality of coils thereby generating the first magnetic fields,
   wherein the first magnetic fields are applied to the TMS sequentially according to a rotation of the tire or the wheel, and
   wherein the first alternating current and the second alternating current are applied to the plurality of coils such that adjacent first magnetic fields have opposite phases.

12. The method of claim 11, further comprising determining that the charging voltage of the battery is lowered below a reference voltage,
   wherein generating the first alternating current and the second alternating current is performed in response to determining that the charging voltage of the battery is lowered below the reference voltage.

13. The control method of claim 11, wherein the TMS is more strongly influenced by one of the first magnetic fields than by the other first magnetic fields during a portion of rotation of the time of the wheel in which the TMS passes through a region in which the first magnetic fields are present.

14. The method of claim 11, further comprising:
   generating, by the TMS, a second magnetic field by application of a portion of an induced current by the first magnetic fields,
   identifying, by the main transceiver, a condition of a current used for wireless charging by the TMS based on the received second magnetic field, and
   adjusting, by the main transceiver, a polarity conversion frequency of the first magnetic fields according to the identified condition of the current.

15. The method of claim 14, wherein, in adjusting of the polarity conversion frequency, the main transceiver increases the polarity conversion frequency when the identified current condition is lower than a reference value or when a charging voltage of the battery is maintained for a predetermined time or lower than before.

16. The method of claim 11, further comprising:
   adjusting, by the main transceiver, a polarity conversion frequency of the first magnetic fields depending on a rotational speed of the tire during wireless charging of the battery.

17. The control method of claim 16, wherein in adjusting of the polarity conversion frequency, the main transceiver increases the polarity conversion frequency when the rotational speed of the tire decreases to a reference value or less during wireless charging of the battery.

* * * * *